United States Patent [19]

Pedersen

[11] Patent Number: 4,958,958

[45] Date of Patent: Sep. 25, 1990

[54] SUBTERRANEAN HEAT INSULATED PIPE SYSTEM WITH A BENDING, AND A METHOD OF ESTABLISHING SUCH A SYSTEM

[75] Inventor: Hans N. Pedersen, Horsens, Denmark

[73] Assignee: I. C. Moller A/S, Fredericia, Denmark

[21] Appl. No.: 341,747

[22] Filed: Apr. 21, 1989

Related U.S. Application Data

[63] Continuation of Ser. No. 115,412, Nov. 2, 1987, abandoned, which is a continuation-in-part of Ser. No. 661,946, May 18, 1984, abandoned.

[30] Foreign Application Priority Data

May 20, 1983 [DK] Denmark .............................. 2251/83

[51] Int. Cl.$^5$ ................................................ F16L 1/02
[52] U.S. Cl. .................................... 405/154; 138/105; 405/157
[58] Field of Search ............... 405/154, 156, 157, 184; 138/105, 149, 155, DIG. 8; 285/41, 179

[56] References Cited

U.S. PATENT DOCUMENTS

| | | |
|---|---|---|
| 3,267,681 | 8/1966 | Maloney .............................. 405/154 |
| 3,563,825 | 2/1971 | Segura et al. ..................... 405/157 X |
| 3,788,083 | 1/1974 | Lundgren .............................. 405/154 |
| 4,075,861 | 2/1978 | Thyberger et al. .................. 405/154 |
| 4,449,853 | 5/1984 | Mennella et al. .................... 405/184 |

FOREIGN PATENT DOCUMENTS

| | | | |
|---|---|---|---|
| 134799 | 3/1979 | German Democratic Rep. ..................... 405/154 |
| 877204 | 11/1981 | U.S.S.R. ............................. 405/154 |

Primary Examiner—David H. Corbin
Attorney, Agent, or Firm—Antonelli, Terry, Stout & Kraus

[57] ABSTRACT

In a subterranean heat insulated pipe system as laid with angellike bendings between straight pipe lengths, i.e. a district heating pipe underneath a street angle, the conventional bending elements are substituted by pipe elements joined so as to form a bending run of a relatively large bending radius, which, depending of the pipe size, has a minimum value, by which the pipe bending by itself and by interaction with the earth is able to take up the expansion and contraction forces, which are created in the pipe in response to temperature changes therein. The said minimum value has been found to be so low that in many instances it is hereby possible to avoid the sharp bending elements with their associated heavy problems due to expansion effects.

22 Claims, 1 Drawing Sheet

SUBTERRANEAN HEAT INSULATED PIPE SYSTEM WITH A BENDING, AND A METHOD OF ESTABLISHING SUCH A SYSTEM

BACKGROUND OF THE INVENTION

This is a continuation application of U.S. application Ser. No. 115,412, filed Nov. 2, 1987, now abandoned, which is a continuation in part of U.S. Ser. No. 661,946, filed May 18, 1984, now abandoned.

The present invention relates to a method of establishing subterranean, heat insulated pipe systems, whereby a single or double pipe is laid in the ground with a pronounced change of direction, e.g. with an angular configuration underneath a street crossing.

In practice it is unavoidable that long district heating transmission pipes are to be laid in a non-straight manner, particularly near or in city areas, and it is hereby natural that the subterranean pipe is established with the use of standard components in the form of straight, heat insulated pipe elements, which are joined into straight partial lengths of the transmission pipe, and pipe elbow elements, which are mounted locally for making the required direction changes possible, such that the pipe line will extend in a "broken" manner. Theoretically it is perfectly possible to produce pipe elements of any desired curvature, whereby the mounted pipe could extend more or less softly curved, but in practice this will be economically unrealistic.

A typical picture of a subterranean pipe, therefore, is a number of straight pipe lengths stretching between "points" of sharp bendings, and it is well known that this involves special problems with respect to the thermal expansions as occurring in the pipe for changing temperatures thereof, particularly in response to the considerable temperature difference as existing between the ambient pipe mounting temperature and the later, much higher operational temperature of the pipe.

It is already known that a subterranean pipe may be generally anchored against carrying out thermally conditioned changes of length, when it is frictionally engaged by the surrounding earth, whereby an expansion tendency will just be converted into an increasing compressive stress in the pipe without any movement thereof, but this behavior is not found in such partial pipe lengths, which are located just adjacent to a pipe elbow because on the other side thereof there will be no straight continuation of a correspondingly frictionally anchored pipe length. Usually, therefore, an axial compensator is mounted in the pipe near the bendings, or these are utilized as axial compensators, with the heat insulation material in the bending elements being soft and resilient, whereby one of the adjacent pipe lengths may expand towards the bending by causing the other adjacent pipe length or pipe branch of the bending to get forced laterally outwardly in the bending area, just as later on a corresponding contraction may take place in response to a decreasing pipe temperature. Alternatively, in some situations, the pipe length or lengths adjacent the bending may be rigidly anchored to the ground as a substitute for the frictional anchoring as would have been caused by a straightly continued pipe length.

However, considerable costs and/or other drawbacks are connected with the use of axial compensators, ground anchorings and bending elements fitted with a soft insulation material, and it is the purpose of the invention to provide a method of establishing a pipe system such that the discussed problem is solved in a more advantageous manner.

The invention is based on the recognition that while the earth outside the bent off end of a pipe length will be unable to resist the concentrated expansion pressure from the outer portion of the pipe length as not sufficiently anchored by the earth friction, the earth will nevertheless provide for a certain counter pressure against the expansion. This counter pressure is insufficient to resist the expansion pressure just outside a sharp bending, but if the pipe bending is provided with a relatively large radius or curvature the expansion will take place against a considerably enlarged counter pressure area of the earth, whereby the total counter pressure is increased considerably. In the transition from a straight pipe length to a very slightly curved pipe the curved pipe will be anchored against being displaced already by virtue of the existing earth friction, and when the curved pipe is of a slightly increased curvature the displacement resistance of the earth adjacent the outside of the bending will correspond to or directly cause such an increased friction, by which the pipe can still not carry out any real expansion movement. For a still further increased curvature of the curved pipe a condition of equilibrium will be reached, in which the combination of the general earth friction and the increased friction as caused by the expansion pressure of the bending against the earth adjacent the outside of the bending will just correspond to the anchoring as effected by the earth friction alone against a long, straight pipe length.

Both calculations and practical experiments have shown that this condition or state of equilibrium will refer not only to a pipe expansion, but also to a pipe contraction, because the conditions are principally the same when the earth is considered outside a bending in an expanding system and inside the bending in a contracting system. If, therefore, a pipe system is considered in an earth friction anchored condition, in which it is heated to a temperature midways between a low mounting temperature and a high operational temperature, then a suitably curved pipe bending will give rise to the said equilibrium as far as both expansion and contraction is concerned, i.e. even along the pipe bending the pipe will behave just as a straight pipe length, which is already by the earth friction prevented from carrying out thermally conditioned movements inside an existing practical temperature interval, inside which the temperature changes of the pipe will only result in corresponding changes of the compression or tensile stress conditions of the pipe.

Based on these considerations it has been found, by way of both calculations and experiments, that the minimum bending radius as sufficient for providing the said equilibrium condition for a pipe of a given size is surprisingly small, such that in practice there is a very attractive aspect in using a correspondingly curved pipe length as an advantageous alternative to a conventional concentrated pipe bending. In city areas, district heating pipes are normally bound to be laid under streets and trottoirs, whereby there will be a natural demand for many marked bendings on the pipes, and so far this has been perceived as synonymous with the use of conventional, rather sharp bendings with associated compensation problems. The invention, however, provides for the recognition that a pronounced change of direction may be established through a "self-compensating"

bending, the radius of which, of course, is considerably larger than the radius of a conventional bending, but not so large as to prevent the self compensating bending from being mounted e.g. underneath wide street crossing areas.

The required minimum radius of a self compensating bending according to the invention will depend of the pipe diameter, since a small pipe diameter will condition a bending radius which is smaller than for a larger pipe diameter. This is due to the fact that the cross sectional area of the material in an iron or steel pipe relative the pipe diameter is usually larger for a larger pipe diameter, whereby the expansion force for a given temperature change and for an increasing pipe diameter will increase considerably more than corresponding to the increased pipe diameter. It is the latter which determines the forces as transferred to the earth, and for an increasing pipe diameter, therefore, it will be necessary that the curvature of the bending is decreased, in order to make the expansion force against each area unit of the counter pressing earth just small enough to enable the earth to take up the pressure without yielding. In practice the bending radius for a middle size pipe should be of the magnitude 20–30 m when the pipe is laid in ordinary earth, while the bending radius for a thin pipe of the dimension 26,9×2,3/90 mm should only be some 5 m; for a thick pipe of the dimension 1016×12,5/1200 mm the minimum bending radius should be about 85 m.

For the determination of the radius of the self compensating bending in connection with heat insulated pipes it has to be considered that the expansion force is produced by the conductor pipe itself, while the pipe diameter as decisive for the pressure transfer between the pipe and the earth is the outer diameter of an outer protective pipe, which is normally arranged to surround the heat insulating material about the inner conductor pipe. Preferably the heat insulating material is a stiff foam material, which is well suited to transfer the lateral pressure between the outer protective pipe and the inner and thinner conductor pipe. It should be considered, moreover, that the pipes often occur as double pipes located sidewise to each other as supply and return pipes, respectively; with such a double pipe extending through a bending the resulting expansion or contraction force will be produced by both of these pipes, i.e. so as to be larger than the corresponding force from a single pipe, while the earth pressure cannot act upon but the outer diameter of one of the pipes, unless the pipes are arranged one above the other. In the above examples these conditions have been taken into account, and it is possible to disclose quite simple calculation formulae for determining the required minimum bending radii for various pipe dimensions. For usual steel pipes as provided with a surrounding rigid insulation the curvature radius, R, will be expressed at least approximately by the following expression, when the pipe is a double pipe with the single pipes located sidewise to each other:

$$R = \frac{S \cdot 130}{p \cdot D}, \text{ where,}$$

S = the steel area of the single conductor pipes, in cm$^2$,
p = anticipated maximum earth pressure against the pipe, in kp/cm$^2$, and
D = the exterior diameter of the outer protective mantle tube of the conductor pipes, in mm.

The maximum earth pressure p indicates the counter pressure as produceable by the earth against a surface perpendicular to the direction of the expansion, without the earth giving way. The value p should be determined on the basis that the pipe will normally be of a circular cylindrical cross section, which does not show any planar pressure surface against the earth, and it has been found realistic to equate the earth pressure against the outer pipe side with a pressure against a planar surface, which is orthogonal to the pressure direction and has a height of ⅔ of the exterior pipe diameter.

In ordinary earth the maximum or permissible earth pressure normally is about 1,5 kp/cm$^2$, which will thus correspond to a pressure of about 1 kp/cm$^2$ against the diametric plane of a round pipe. In case of a double pipe, i.e. two parallel pipes arranged side by side, the correspondingly increased expansion potential should be taken into account by making use, in the said expression, of a halved value of the maximum earth pressure on the diameter plane of the exterior pipe. In ordinary earth the value of p can normally be set to 0,5 kp/cm$^2$, whereafter the expression for the bending radius R will be, $$R = \frac{S}{D} \cdot 260$$

A typical bending radius of a medium-sized pipe will be some 20–30 m, and such a bending is easy to establish e.g. in a street crossing.

The external mantle pipe normally consists of plastic, and the inner insulation foam is a rigid foam, which sticks to both the conductor pipe and the mantle pipe so as to be able to transfer longitudinal forces between these pipes. In some pipe systems also the mantle pipe is of iron or steel; here the mantle pipe will contribute to the length anchoring of the entire pipe, corresponding to an increased earth friction, and for this reason such pipes may be laid with a bending radius, which is smaller than for pipes with a plastic mantle tube.

Ideally the bending should consist of an evenly curved pipe length having the relevant bending radius, and it is technically possible to manufacture long pipes with such bended configuration, particularly as far as relatively thin pipes are concerned. In the production of prefabricated insulated pipe elements with conductor pipes of steel up to about 10" it will be possible to bend the ready made, straight pipes to the required curvature, and the bent pipe elements may then be cut for adaptation to various desired bending angles, primarily 90° and 45°. A large pipe bending can be difficult to handle and to ship, and it can be chosen, therefore, to work with relatively short bending segments, which are joined in situ. It is in all instances advantageous that the bending radius is known in advance for the single pipe dimensions, when the pipes are to be laid in ordinary earth.

In practice, however, the bendings should not necessarily show a completely even curving, when the maximum operational temperatures are within the range as usual for district heating water, i.e. about 80–120° C., because the bending stresses may then be kept permissibly low even in case of small deviations from the ideal shape of the bending. This is particularly important in that the bendings may be produced from straight pipe pieces so as to show a "broken" configuration. The working out of a large number of joints between short pipe pieces is not too attractive, and it is a lucky coincidence, therefore, that bendings of small radii and therewith of short lengths may be produced in a simple manner by bending of reasonably long pieces of pipe, since the pipes are of small size, while thick pipes, which cannot be bent, should be laid with a large bending radius and a correspondingly large length, such that they can be produced in situ by the joining of straight pipe elements of a considerable length. Already for a medium-sized pipe such as e.g. 273×5/400 mm the bending can be produced from straight pipe segments of a length of about 6 m, these segments being joined with a change of direction of about 13° per joint. For still heavier pipes the segment lengths may be still larger, and soon the length of the segments will approach or reach the length of the standard pipe elements as used in commercial maximum lengths for the mounting of the straight pipeline lengths. For heavy-sized pipes, therefore, the provision of the self compensating bendings will merely be a question of suitable joinings between standard pipe elements as arranged along the bending length.

In widespread district heating systems the invention conditions the saving of a large number of special bending elements, axial compensators and ground anchorings.

DETAILED DESCRIPTION

Figure 1:
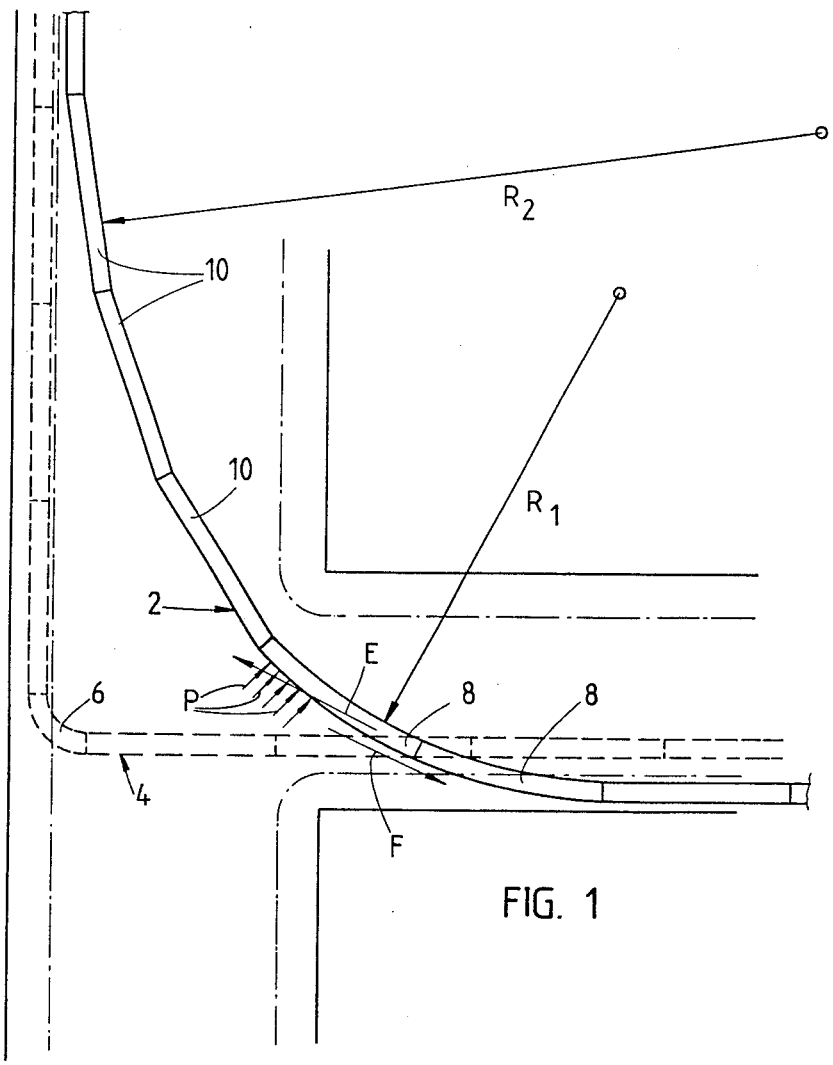
FIG. 1 is a schematic view of a street junction with a pipe system according to the invention.

In FIG. 1 in full lines, a district heating pipe 2 is depicted as passing a street corner through a self stabilizing bending according to the invention. Also shown, in dotted lines, is another corresponding pipe 4 as passing the same area in a conventional manner, with the use of a special bending element 6 and special additional elements (not shown) such as axial compensators.

Two pipe elements 8 in the soft bending of the pipe 2 are of a prefabricated curved type with bending radius $R_1$, while three other pipe elements 10 are shown as constituted by prefabricated straight elements as joined with a small change of direction in a bending with the marked radius $R_2$. Normally, of course, a given bending will comprise only one of the element types 8 and 10.

An arrow E represents an expansion force, while an arrow F represents the earth friction and arrows P represent the counter pressure from the earth against actual expansion.

Figure 2:
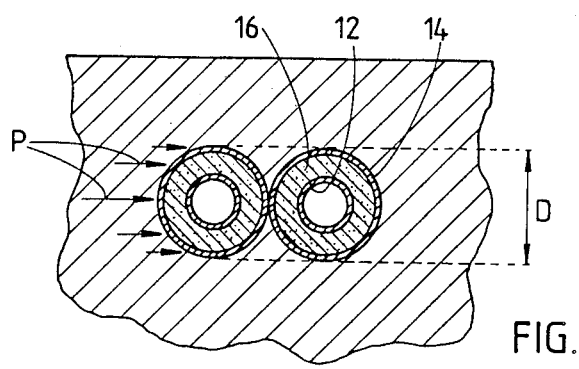
FIG. 2 is a cross sectional view of a double pipe.

Normally a heat transmission pipe is constituted by a double pipe as shown in FIG. 2, with the single pipes consisting of an inner conductor pipe 12 of iron or steel, an outer protective mantle pipe 14 of plastic and an intermediate insulation material 16. The diameter D and the earth pressure arrows P are indicated.

It should be mentioned that the general expression for the bending radius is, $$R = \frac{S \cdot Z}{P \cdot D}, \text{ wherein,}$$

S, P and D are as before, while
$Z = E \cdot \alpha \cdot \Delta t$, where,
Z is the coefficient of elasticity of the conductor pipe, $\alpha$ is the expansion coefficient thereof, and $\Delta t$ is the expected maximum change of the pipe temperature.

In the above examples $\Delta t$ has been set to 50° C., corresponding to a total change of about 100° C. from a medium temperature, by which the pipe system has been friction fixed in the ground according to the technique as disclosed in U.S. Pat. No. 3,932,922.

What is claimed is:

1. A subterranean heat insulated pipe system for conveying a fluid having a temperature deviating from an ambient temperature surrounding the heat insulated pipe system, the heat insulated pipe system being surrounded by a stiff insulation foam, the pipe system comprising at least two straight pipe lengths, at least one angle bending pipe length means for interconnecting the straight pipe lengths so as to form a first bending run beneath, for example, a street crossing, characterized in that the angle bending pipe length means has a radius of curvature substantially just sufficiently small enough to condition the bending to be fully self stabilized solely in and by engagement with the earth without any additional anchoring means against expansion and contraction forces resulting from internal temperature changes in the pipe system.

2. A subterranean heat insulated pipe system according to claim 1, wherein at least two additional straight pipe lengths are disposed in parallel to said first mentioned at least two straight pipe lengths in a side-by-side relationship, at least one additional angle-bending pipe length means is provided for interconnecting said two additional straight pipe lengths so as to form a second bending run said first and second bending rear being disposed side-by-side and having substantially the same center of curvature and substantially equal radius of curvature, said radius or radii of curvature substantially just small enough to condition the bending to be fully self stabilized solely in and by engagement with the earth without any additional anchoring means against expansion and contraction forces resulting from internal temperature changes in the pipe system and wherein a center of curvature of said first and second bending runs is disposed inside an innermost bending run of the first and second bending runs.

3. A subterranean heat insulated pipe system according to claim 2, wherein the required bending curvature of each of the angle-bending pipe length means is determined in accordance with the following relationship:

$$R = \frac{S \cdot X}{p \cdot D},$$

where:
S=the steel pipe area of the pipe length means, in $cm^2$,
p=anticipated maximum earth pressure against the pipe length means, in $kp/cm^2$,
D=an exterior diameter of an outer protective mantle tube the pipe length means, in cm, $Z = E \cdot \alpha \cdot \Delta t$ where:
E=the coefficient of elasticity of the pipe length means,
$\alpha$=the coefficient of thermal expansion of the pipe length means, and
$\Delta t$=a temperature change of the pipe length means.

4. A subterranean heat insulated pipe system according to claim 3, wherein the required bending curvature is in a range of between 0.7R to 2R.

5. A subterranean heat insulated pipe system according to claim 1, wherein two bending curves are provided and are disposed in parallel to each other in a side-by-side relationship and wherein the minimum bending radius of the angle-like bending pipe length means is determined in accordance with the following relationship:

$$R = \frac{S \cdot X}{p \cdot D},$$

where:
S = the steel pipe area of the pipe length means, in cm$^2$,
p = anticipated maximum earth pressure against the pipe length means, in kp/cm$^2$,
D = the exterior diameter of an outer protective mantle tube of the pipe length means, in cm.
Z = the stress arising in the pipe system that is heated at Δt° C. and of which a thermal expansion is obstructed, $$Z = E \cdot \alpha \cdot \Delta t$$

where:
E = the coefficient of elasticity of the pipe length means,
α = the coefficient of thermal expansion of the pipe length means, and
Δt = temperature change of the pipe length means.

6. A subterranean heat insulated pipe system according to claim 5, wherein the required bending curvature is in a range of 0.7R to 2R.

7. A method of installing a subterranean heat insulated pipe system surrounded by a stiff insulating foam, the heat insulated pipe system conveying a fluid of a temperature deviating from an ambient temperature surrounding the heat insulated pipe system, whereby one of a single and double pipe is mounted in the ground so as to have a pronounced change of direction between two straight pipe runs, the method comprising the steps of mounting at least one curved pipe element or a plurality of straight pipe elements, joining the pipe elements so as to form an approximately evenly curved bending, with a radius of curvature of a bending run being at least equal to or somewhat larger than a maximum curvature by which the bending is fully self stabilized solely in and by engagement with the earth without any additional anchoring means against expansion and temperature contraction forces resulting from internal temperature changes in the pipe system.

8. A method according to claim 7, characterized in that, for a steel conductor pipe with plastic mantel pipe, the bending is established with a bending radius approximately given by the expression:

$$R = \frac{S}{D} \cdot 130$$

S = cross sectional steel area of the conductor pipe, in cm$^2$, and
D = exterior diameter of the mantle pipe, in mm.

9. A method according to claim 8, characterized in that for a double pipe with the pipes located side by side the bending is established with the bending radius 2R.

10. A method according to claim 7, characterized in that the bending for pipe sizes up to about 10" is established by mounting and joining prefabricated curved pipe elements.

11. A method according to claim 7, characterized in that the bending is established by joining straight pipe elements having a length of at least 5 m and with a change of direction of at most 15° at each joint.

12. A subterranean heat insulated pipe system wherein a fluid conducting pipe is surrounded by a stiff insulation foam connecting a conductor pipe with a surrounding outer mantle pipe, and constructed of elongated prefabricated pipe elements joined to form at least two straight pipe line lengths which, in a local area are joined through an angularly bent pipe means at, for example, a street crossing, characterized in that the angularly bent connection is constituted by an arcuate pipe length having a length which is very large as compared with the pipe diameter, and with a curvature of the arcuate pipe length being substantially just sufficiently small enough to condition the arcuate pipe length to be self stabilizing solely by friction and counter pressure from a surrounding filling without any additional anchoring means against expansion and contraction tendency caused by temperature changes of or in the pipe system.

13. A subterranean heat insulated pipe system including a heat insulated pipe means surrounded by a stiff insulation foam, said heat insulated pipe means including at least one pipe means for conveying a fluid of a temperature deviating from ambient temperature surrounding the heat insulated pipe systems, said at least one pipe means including a first portion extending in a first direction, a second portion extending in a direction at an angle to said first direction, and a third curved portion connecting said first and second portions, said third curved portion having a radius of curvature at least equal to or somewhat larger than a minimum curvature by which the third curved portion is fully self-stabilized solely in and by an engagement with the earth without any additional anchoring means against expansion and contraction forces resulting from internal temperature changes in the heat insulated pipe system.

14. A subterranean heat insulated pipe system according to claim 13, wherein an outer mantel is provided for surrounding said heat insulated pipe means.

15. A subterranean heat insulated pipe system according to claim 14, comprising at least two insulated pipe means disposed in parallel in a side-by-side relationship, each of said at least two heat insulated pipe means including a first, second, and third curved portions for connecting the first and second portions of the respective heat insulated pipe means, an outer mantle pipe means is provided for surrounding each of the two insulated pipe means, and wherein a substantially common center of curvature of the two third curved portions is disposed inside of an innermost curved portion of the two insulated pipe means.

16. A subterranean heat insulated pipe system according to claim 15, wherein the curvature of the third curved portion of the two heat insulated pipe means is determined in accordance with the following relationship:

$$R = \frac{S \cdot X}{p \cdot D},$$

where:
S = the steel pipe area of the pipe means, in cm$^2$, p = anticipated maximum earth pressure against the pipe means, in kp/cm², D = the exterior diameter of the outer protective mantel, in cm, $$Z = E \cdot \alpha \cdot \Delta t$$

where:

E = the coefficient of elasticity of the pipe means,

α = the coefficient of thermal expansion of the pipe means, and

Δt = a temperature change of the pipe means.

17. A subterranean heat insulating pipe system according to claim 16 wherein the curvature of the curved portions is in a range of between 0.7R to 2R.

18. A method of installing a subterranean heat insulated pipe system including a pipe means for conveying a fluid of a temperature deviating from an ambient temperature surrounding the heat insulated pipe system surrounded by a stiff insulation, the method comprising the steps of laying a first length of said pipe means so as to extend in a first direction, laying a second length of said pipe means so as to extend in a direction deviating from said first direction, and laying a third length of said pipe means so as to extend in a direction deviating from said second direction, wherein the step of laying the second length of pipe includes bending at least a portion of said second length of pipe means into a self holding arched shaped so as to have a radius of curvature at least equal to a maximum curvature by which the bending is fully self stabilized solely in and by an engagement with the earth without any additional anchoring means against expansion and contraction forces resulting from internal temperature changes in the pipe system.

19. A method of installing a subterranean heat insulated pipe system according to claim 18, wherein the second length of pipe means includes a plurality of individual pipe elements, and wherein the step of bending at least a portion of said second length of pipe means includes bending each of the individual pipe elements into a self-holding arched shape, and wherein the method further comprises assembling the curved pipe elements to form a bending run having said radius of curvature.

20. A method of installing a subterranean heat insulated pipe system according to claim 19, wherein at least two pipe means are provided, said two pipe means being disposed in parallel to each other in a side-by-side relationship, and wherein the step of laying the second pipe length includes bending the respective second pipe lengths so as to have said radius of curvature.

21. A method of installing a subterranean heat insulated pipe system according to claim 20, wherein the curvature of the third curved portions is determined in accordance with the following relationship:

$$R = \frac{S \cdot X}{p \cdot D},$$

where:

S = the steel pipe area of the single conductor pipes, in cm², p = anticipated maximum earth pressure against the pipe, in kp/cm², D = the exterior diameter of the outer protective mantle tube of the pipe length means, in cm, Z = the stress arising in the pipe system that is heated at Δt° C. and of which a thermal expansion is obstructed, $$Z = E \cdot \alpha \cdot \Delta t$$

where:

E = the coefficient of elasticity of the pipe length means,

α = equals the coefficient of thermal expansion of the pipe length means, and

Δt = equals a temperature change of the pipe length means.

22. A method according to claim 21, wherein radius of curvature is in a range between 0.7R to 2R.

* * * * *